(12) United States Patent
Suzuki et al.

(10) Patent No.: US 6,462,893 B1
(45) Date of Patent: Oct. 8, 2002

(54) LENS DRIVING APPARATUS FOR DISK PLAYER

(75) Inventors: Jun Suzuki; Katsumi Ishii, both of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/640,375

(22) Filed: Aug. 17, 2000

(30) Foreign Application Priority Data

Aug. 24, 1999 (JP) .......................................... 11-236339

(51) Int. Cl.⁷ ............................ G02B 7/02; G02B 7/102
(52) U.S. Cl. ...................................... 359/814; 359/824
(58) Field of Search ................................. 369/244, 219, 369/13, 44.14, 44.15, 256; 359/808, 824, 813, 814, 819

(56) References Cited

U.S. PATENT DOCUMENTS

| | | | | |
|---|---|---|---|---|
| 4,568,142 A | * | 2/1986 | Iguma | 350/6.3 |
| 4,646,283 A | * | 2/1987 | Ito et al. | 369/256 |
| 5,359,459 A | * | 10/1994 | Kim | 369/244 |
| 5,448,536 A | * | 9/1995 | Muranishi et al. | 369/13 |
| 5,491,684 A | * | 2/1996 | Terashima et al. | 369/219 |
| 5,537,170 A | * | 7/1996 | Lee et al. | 353/101 |
| 5,627,687 A | * | 5/1997 | Fujisawa | 359/823 |
| 5,666,235 A | * | 9/1997 | Izuka | 359/814 |
| 5,715,231 A | * | 2/1998 | Nagasato et al. | 369/247 |
| 5,870,373 A | * | 2/1999 | Choi et al. | 359/824 |
| 5,986,825 A | * | 11/1999 | Marino et al. | 359/808 |

* cited by examiner

Primary Examiner—Ricky Mack
Assistant Examiner—Omar Hindi
(74) Attorney, Agent, or Firm—Sughrue Mion, PLLC (57) ABSTRACT

In the lens driving apparatus of a disk player, a pair of magnets 20 for generating magnetic fields are fixed to a pair of yokes 21, respectively to generate a magnetic gap therebetween. The pair of yokes 21 are oppositely arranged on and fixed to a plate-like actuator base 10 by plural screws 12 through a fixing member 11. A movable portion 50 is movably hung by four supporting wires 32 (or plate screws) on a supporting base 31 that is fixed to the actuator base 10. The movable portion 51 is arranged within the above magnetic gap. In such a configuration, the apparatus for a disk player can shift a natural resonance frequency to a high frequency and can be operated at a high speed.

19 Claims, 11 Drawing Sheets

LENS DRIVING APPARATUS FOR DISK PLAYER

BACKGROUND OF THE INVENTION

1. Field of the Invention

The present invention relates to a lens driving apparatus for a disk player, and more particularly to a structure of a movable portion of the lens driving apparatus.

2. Description of the Related Art

A disk player reads information recorded on a disk using laser light to read/write a signal optically. The lens driving apparatus drives for such a disk player drives an objective lens while focus control and tracking control are executed in accordance with the driving signals supplied to driving coils consisting of a focus coil and tracking coil wound on a holder provided with the objective lens.

Figure 12:
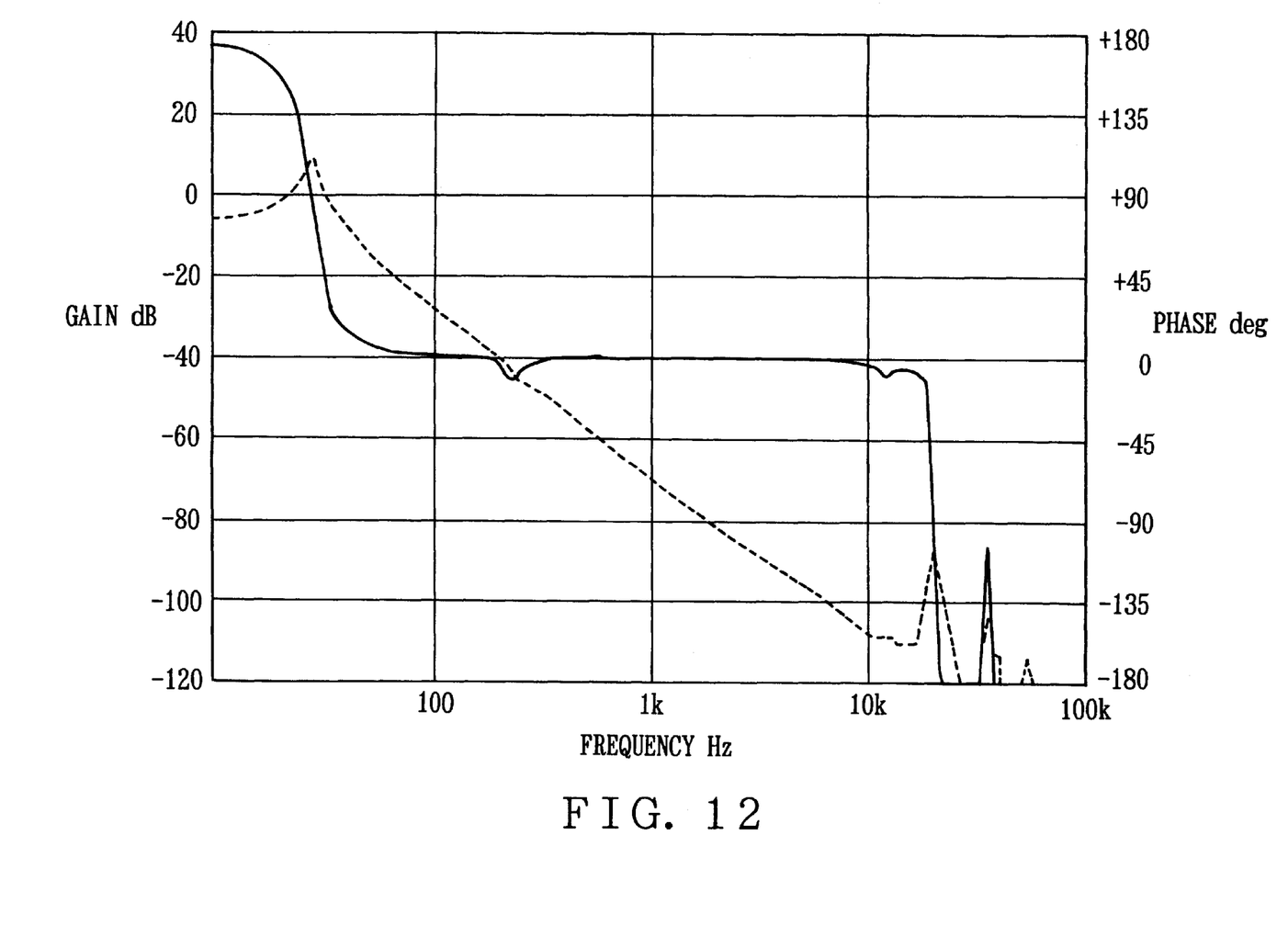
FIG. 12 is a graph showing the electric characteristic of the lens driving apparatus for a disk player according to a prior art.

The lens driving apparatus generally has respective natural resonance frequencies in the focus control and tracking control. These natural frequencies depend on physical resonance formed by e.g. size or mass of the holder. When the lens driving apparatus is driven in the vicinity of the natural resonance frequencies, harmful oscillation is given to the objective lens. An existing lens driving apparatus has a frequency shown in FIG. 12. In FIG. 12, the abscissa denotes a frequency and the ordinate denotes a gain and a phase. The amplitude characteristic illustrated in dotted line in FIG. 12 provides a gain that decreases substantially linearly with an increase in the frequency except a resonance point in a lower frequency region. The phase characteristic illustrated in solid line is substantially constant until the vicinity of 10 KHz with an increase in the frequency.

However, at a further higher frequency, because of the natural resonance of the lens driving apparatus, the phase characteristic abruptly changes in the vicinity of the natural resonance frequency (e.g. 20 kHz) as shown in FIG. 12. When the phase lag reaches 180°, the control servo system becomes unstable.

Therefore, the lens driving apparatus is designed so that each higher mode resonance is out of each servo band in view of the natural resonance frequency of each control system. Namely, by designing the servo band necessary for actual servo control at an upper limit of e.g. 2 kHz–5 kHz, the control system is made unaffected by the phase shift in the vicinity of the natural resonance frequency.

In recent years, the disk player is operated at a high rotating speed of a disk that is twice or fourth times of the standard rotating speed of the disk. Therefore, there is necessity of the read or write of a signal at a high speed by the lens driving apparatus for the disk player.

The signal read/write at the high speed enlarges each of the servo bands for the respective control systems so that they must be extended to a higher frequency band. However, as described above, the presence of the natural resonance frequency in the vicinity of 20 kHz makes it difficult to assure the margin for the each servo band and higher mode resonance, and hence makes each servo control system unstable.

SUMMARY OF THE INVENTION

An object of the invention is to provide a lens driving apparatus for a disk player which can be operated at a natural resonance frequency shifted to a high frequency for high speed read/write.

In order to attain the above object, in accordance with an aspect of the invention, there is provide a lens driving apparatus for a disk player for movably supporting a holder with an objective lens and a driving coil, wherein the holder comprises an upper wall on which the objective lens is fixed; and a pair of side walls which are integral to the upper wall and aligned apart from each other in a direction of tracking, and the driving coil is wound on each of side edges of the pair of side walls of the holder.

In accordance with another aspect of the invention, there is provided a lens driving apparatus for a disk player for movably supporting a holder with an objective lens and a driving coil in directions of focusing and tracking, wherein the holder comprises an upper wall on which the objective lens is fixed; and a pair of side walls which are integral to the upper wall and aligned apart from each other in a direction of tracking, and the driving coil is a plate-like printed coil which generates driving force in the directions of focusing and tracking and has a coil surface in parallel to each of side edges of the pair of side walls of the holder in both directions of tracking and focusing.

In accordance with still another aspect of the invention, there is provided a lens driving apparatus for a disk player for movably supporting a holder with an objective lens and a driving coil in directions of focusing and tracking, wherein the holder comprises an upper wall on which the objective lens is fixed, a pair of side walls which are integral to the upper wall and aligned apart from each other in a direction of tracking, and a pair of arms aligned apart from each other in a direction of focusing and protruding from the holder in a direction of tracking; and the driving coil is composed of a focus coil wound on the pair of side walls and a tracking coil wound on the pair of arms.

In accordance with the invention, since the left/right side plates are removed from the holder constituting a movable portion, the weight and size of the holder are decreased. This permits the natural resonance frequency to be shifted to a high frequency and lens driving apparatus to make a stabilized operation at a high speed.

The holder can be reinforced by using a plate-like printed coil as the driving coil.

The above and other objects and features of the invention will be more apparent from the following description taken in conjunction with the accompanying drawings.

DESCRIPTION OF THE PREFERRED EMBODIMENTS

Figure 1A:
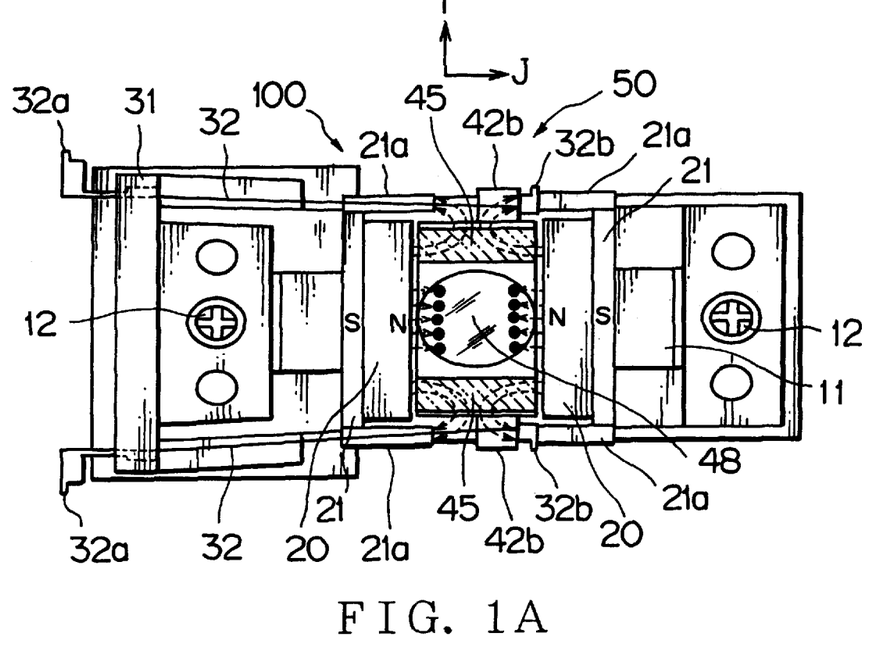
FIGS. 1A and 1B are views showing the structure of a lens driving apparatus for a disk player according to a first embodiment of the invention, respectively.
Figure 1B:
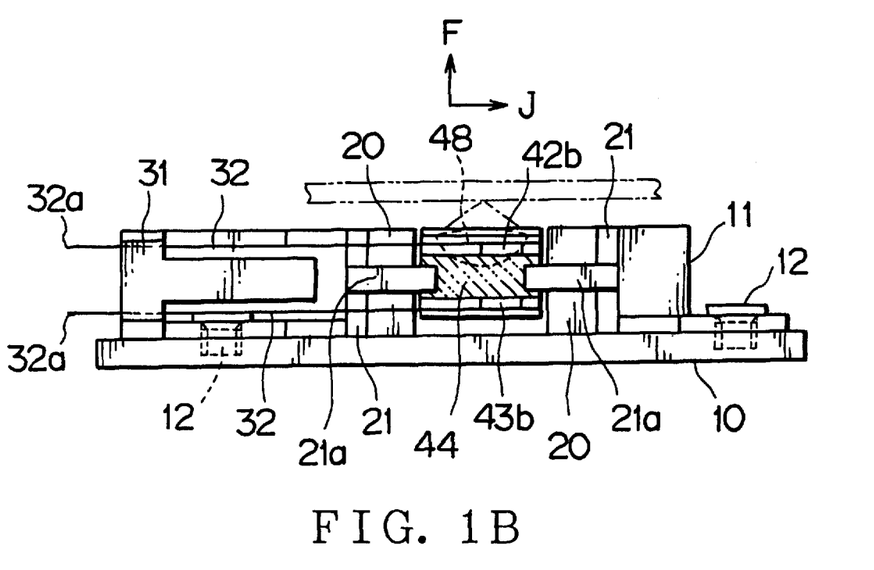

FIGS. 1A and 1B are a plan view and a side view of a lens driving apparatus for a disk player according to an embodiment of the invention, respectively. Referring to FIGS. 1A and 1B, an explanation will be given of the structure of a lens driving apparatus according to an embodiment of the invention.

In the lens driving apparatus for a disk player according to the invention, as seen from these figures, a pair of magnets 20 for generating magnetic fields are fixed to a pair of yokes 21, respectively to generate a magnetic gap therebetween. The pair of yokes 21 are oppositely arranged on and fixed to a plate-like actuator base 10 by plural screws 12 through fixing members 11. A movable portion 50 is movably hung by four supporting wires 32 (or plate screws) on a supporting bases 31 that are fixed to the actuator base 10. The movable portion 51 is arranged within the above magnetic gap.

Each yoke 21 includes auxiliary yokes 21a which are formed by bending both ends of the yoke 21 in a ⊃ shape. Each of the magnets 20 is fixed to the inside of the yoke 21 surrounded by the auxiliary yokes using adhesive. The magnets arranged in the manner described above generate different magnetic fields for a focus coil 44 and tracking coil 45, respectively. The details will be described later.

The movable portion 50 is hung movably three-dimensionally by the four supporting wires 32 made of conductive elastic member. The one end of the supporting wire 32 is rolled and extended to form an extending portion 32a by means of which a portion of the supporting wire 32 is molded by "outsert molding" when the supporting base 31 is molded. Likewise, the other end of the supporting wire 32 is rolled and extended to form a connecting portion 32b which is fixed by adhesive to each of four protrusions 42b, 43b formed to protrude from both sides of a holder 40 described later.

The movable portion 50 is structured so that a focus coil 44 and a tracking coil 45 are wound on the holder 40 incorporating an objective lens 48. The terminals of the focus coil 44 and tracking coil 45 are connected to the connecting portions 32b of the supporting wires 32 by solder.

On the other hand, the extending potion 32a of the supporting wire 32 is connected to a Litz wire (not shown) through which a driving current is externally supplied to the tracking coil 45 or focus coil 44. The movable portion 50 can be freely moved in directions of tracking (arrow T) and focusing (arrow F) within the magnetic gap in accordance with the driving current supplied to the tracking coil 45 or focus coil 44 through the supporting wire 32.

Figures 2A, 2B:
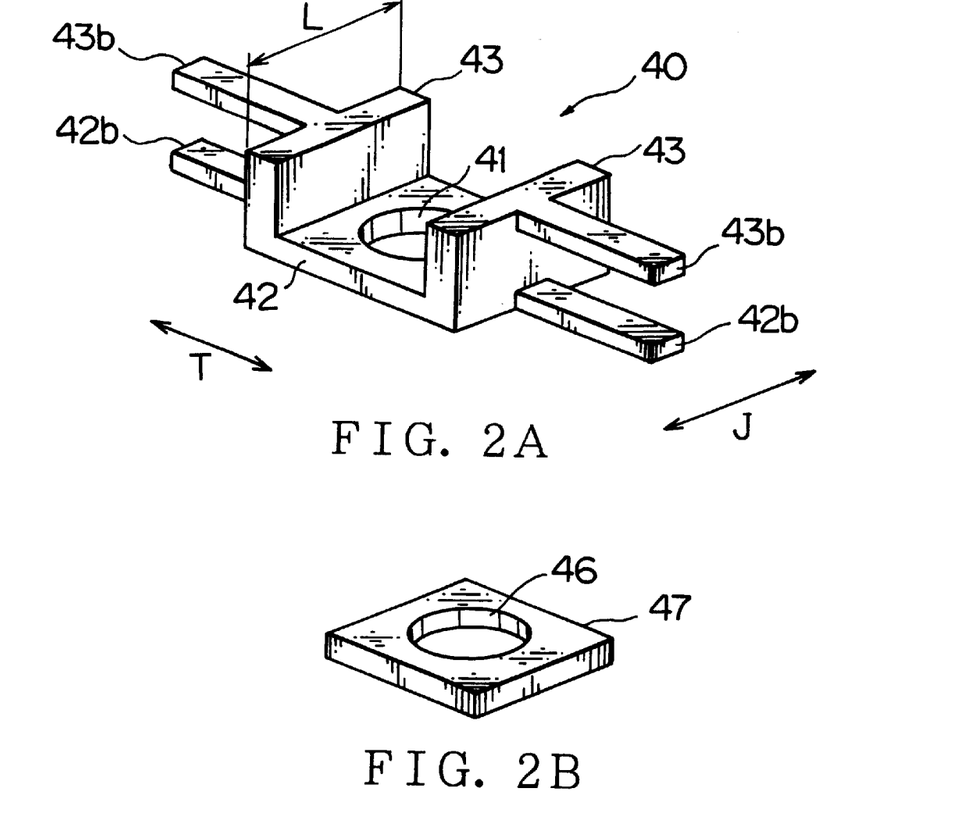
FIGS. 2A to 2C are conceptual views for explaining the holder according to the first embodiment.
Figure 2C:
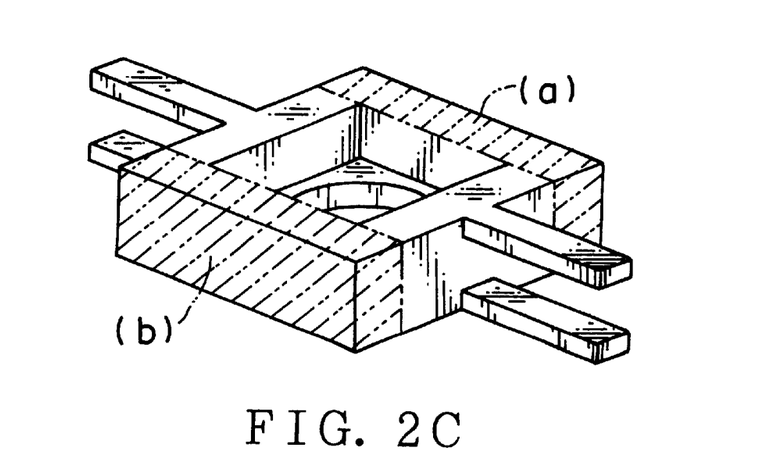
Figure 3A:
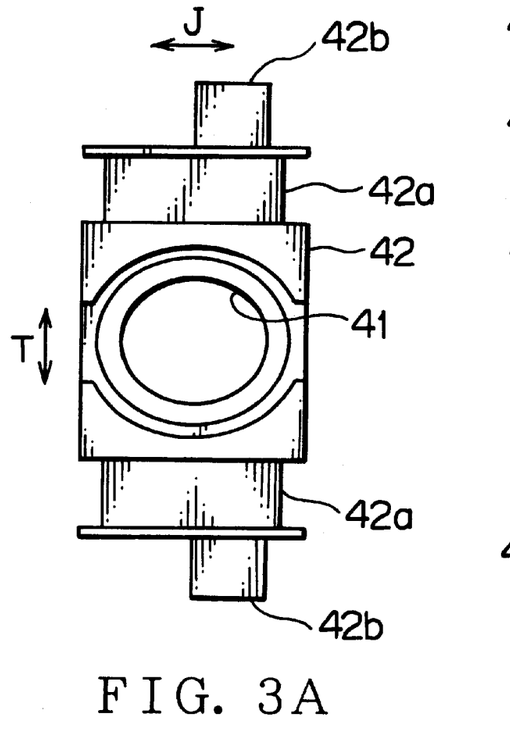
FIGS. 3A to 3c are views of the structure of the holder used in the lens driving apparatus according to the first embodiment.
Figure 3B:
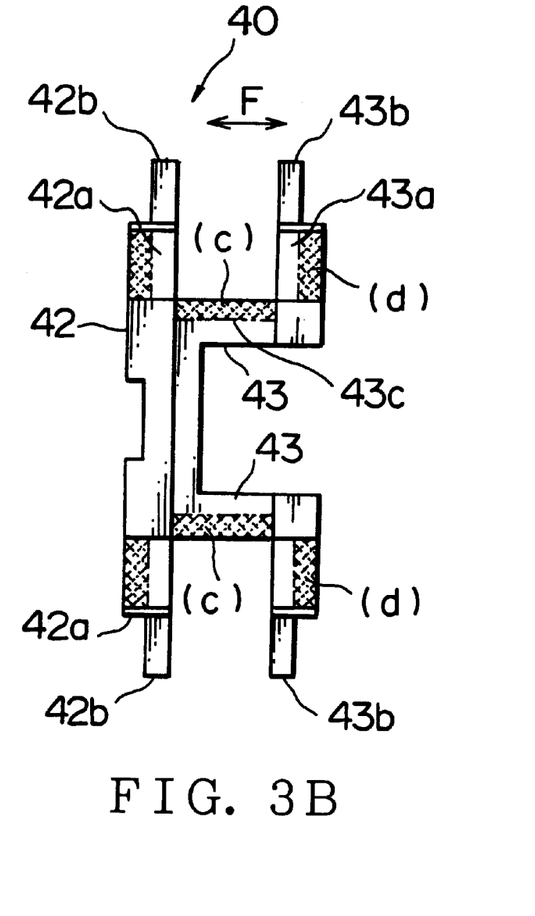
Figure 3C:
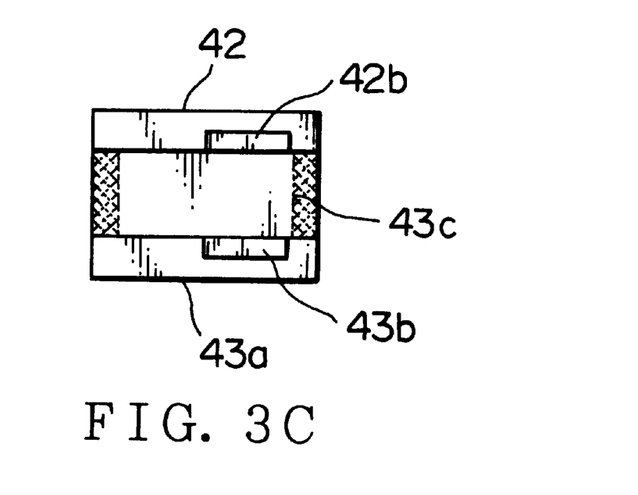
Figure 4A:
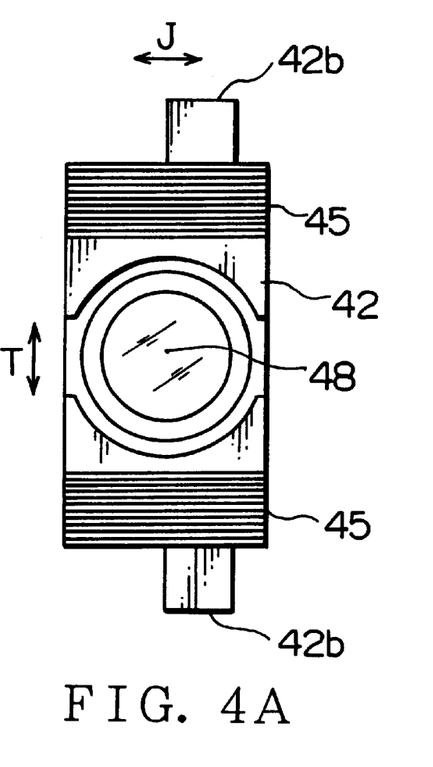
FIGS. 4A to 4C are appearance views of the movable portion used in the lens driving apparatus according to the first embodiment.
Figure 4B:
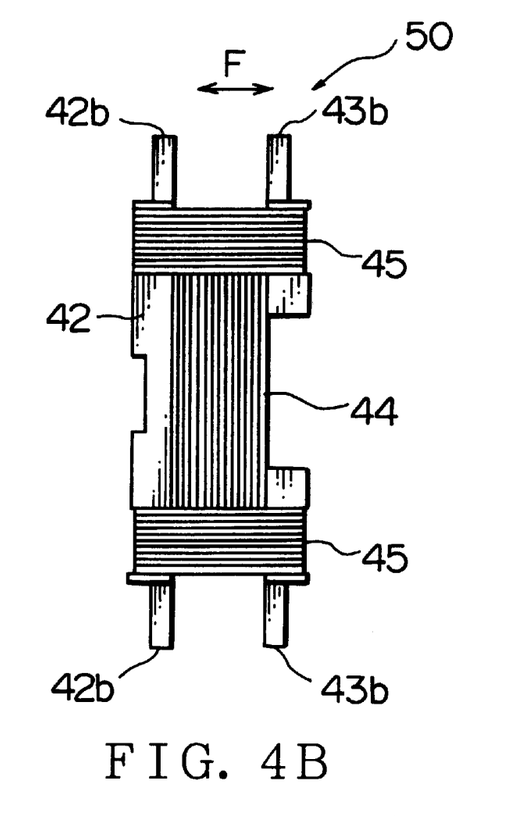
Figure 4C:
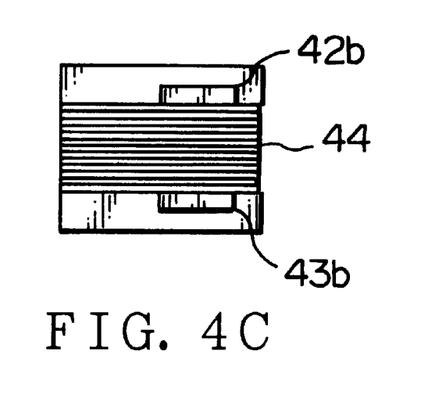

The lens driving apparatus 100 according to an embodiment of the invention is characterized by the structure of the holder 40 constituting the movable portion 50. Referring to FIGS. 2 to 4, an explanation will be given of the structure of the holder 40. FIGS. 2A to 2C are conceptual views for explaining the holder according to the first embodiment. FIGS. 3A to 3C are views of the structure of the holder 40 used in the lens driving apparatus 100. FIGS. 4A to 4C are appearance views of the movable portion 50 in which the focus coil 44 and tracking coil 45 are wound.

The holder 40 has a square shape devoid of left and right side plates in a direction of jitter (arrow J). The holder 40 is composed of an upper wall 42 having an opening 41 that constitutes a light path of an objective lens (not shown) and a pair of side walls 43 having four protrusions 42a, 43a aligned apart from one another in a direction of tracking (arrow T).

The holder 40 is designed to realize its small size and light weight in a manner that the left and right side plates (shaded portions (a) and (b)) aligned in the direction of jitter are removed from a conventional box-shaped holder as shown in FIG. 2C.

By removing the left and right side plates of the holder 40, the natural resonance frequency in the direction of jitter of the holder 40 can be enhanced. As well known, the natural resonance frequency of the structure (or natural frequency) can be expressed by $$f = \frac{1}{2}\pi (k/m)^{1/2} \tag{1}$$

where m denotes mass of the structure and k denotes a spring constant. The spring constant k can be expressed by $$k = 48EI/L^3 \tag{2}$$

where E denotes a longitudinal elastic coefficient, I denotes a secondary moment that is a constant determined by the material of the structure, and L denotes a length of the structure.

As understood from Equation (1), the natural resonance frequency (f) is inversely proportional to the 1/2-th power of the mass (m) of the structure. Therefore, by removing the left and right side plates, the mass of the holder 40 is reduced so that its natural resonance frequency in the direction of jitter can be enhanced.

Further, as understood from Equation (2), the spring constant (k) of the structure is inversely proportional to the third power of the length (L) (in the direction of jitter) of the structure. Thus, by the removing the left and right side plates, the length in the direction of jitter is shortened so that the natural resonance frequency in the direction of jitter can be enhanced. As a result, the natural resonance frequency in the direction of jitter which is defined by the mass and size of the holder 40 can be shifted to a very high frequency region as compared with the conventional structure.

Incidentally, where the upper wall 42 is warped because of removal of the side plates, as the occasion demands, a reinforcement plate 47 having an opening 46 as shown in FIG. 2B may be attached on the upper or lower surface of the upper wall 42.

Referring to FIGS. 3A to 3C, a detailed explanation will be given of the structure of the holder 40 used in the lens driving apparatus. FIG. 3A is a top view of the holder 40. FIG. 3B is a side view when the holder is viewed from the direction of jitter (arrow J). FIG. 3C is a side view when the holder is viewed from the direction of tracking (arrow T).

The holder 40 is formed in a square shape by molding high-rigidity plastic such as polycarbonate or LCP (liquid crystal polymer) or non-magnetic resin. The holder 40 includes an opening 41 centrally formed on the upper wall 42 constituting the light path of an objective lens 48, an arm portions 42a each having a concave groove so as to protrude from both sides of the upper wall 42 (arrow T in the direction of tracking) and protrusions 42b which extend outwardly from the arm portions 42a and substantially in parallel to the upper wall 42. A pair of side walls 43 are arranged oppositely in the direction of tracking (arrow T). Each of the side walls 43 includes, at its tip, an arm portion 43a and protrusion 43b which are arranged in parallel and oppositely to the arm portion 42a of the upper wall 42 and a concave winding groove 43c wound on the outer periphery.

The winding groove 43c of the side wall 43 refers to a winding portion provided for the focus coil (shaded portion c). The depth of the winding portion is set so that the outermost periphery of the focus coil 44 is in substantially parallel to the outer peripheral edge of the outer wall 42 in the both directions of tracking and jitter (arrow J).

The arms 42a on both sides of the upper wall 42 and arms 43a of the pair of side walls 43 constitute a pair of winding portions (shaded portion (d)) for tracking coils 45. The depth of the groove of the winding portion is set so that where the tracking coil with a predetermined number of turns is wound on the winding portion, the outermost periphery of the tracking coil 45 is in substantially parallel to the upper wall 42 in the directions of focusing and tracking.

Thus, the movable portion 50 of the lens driving apparatus 100 for the disk player as shown in FIGS. 4A, 4B and 4C can be completed by winding the focus coil 44 and the tracking coil 45 on the winding portions of the holder 40 and fixing the objective lens in the holder 40. FIG. 4A is a top view of the movable portion 50; FIG. 4B is a side view of the movable portion 50 viewed from the direction of jitter; and FIG. 4C is a side view of the movable portion 50 viewed from the direction of tracking.

As seen from these figures, the terminals of the focus coil 44 are extended out from a pair of the protrusions 43b formed on the side walls 43 of the holder 40. The tracking coils 45 are continuously wound on the arms 42a and 43aformed on the upper wall 42 and side walls 43, respectively and extended out from the pair of protrusions 42b formed on the upper wall 42. Therefore, the movable portion 50 is hung by four supporting wires 32 in such a manner that the protrusions 42b of the upper wall 42 and the protrusions 43b of the side walls 43 are bonded to the four supporting wires 32 and the terminals of the windings are soldered to the connecting portions 32b of the four supporting wires 32. In this state, a driving current is supplied to the focus coil 44 and the tracking coils 45.

Figure 5A:
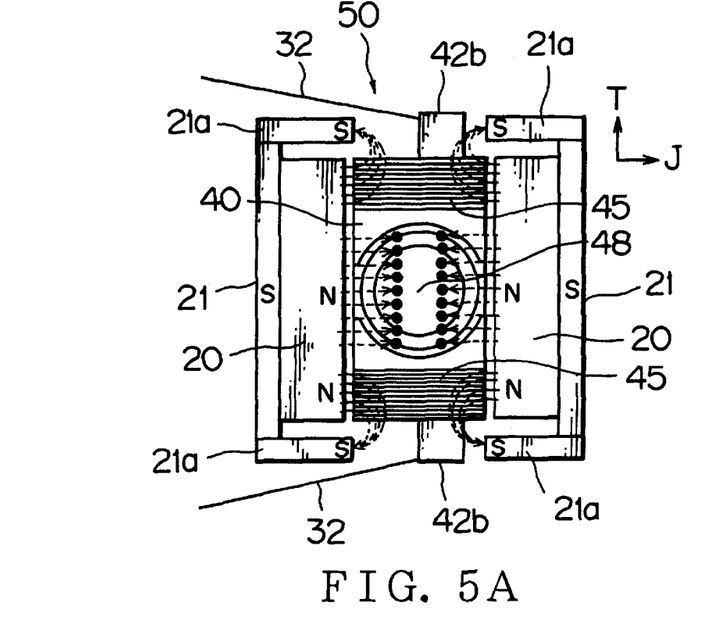
FIGS. 5A to 5C are views for explaining the operation of the lens driving apparatus according to the first embodiment.
Figure 5B:
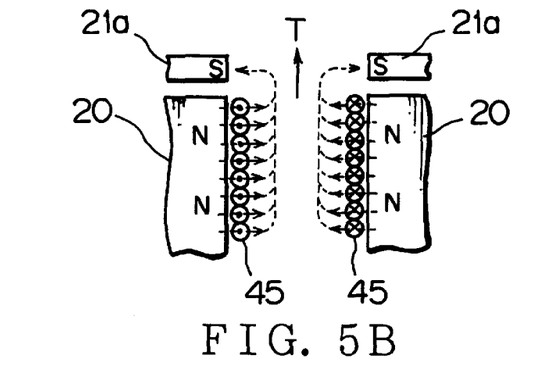
Figure 5C:
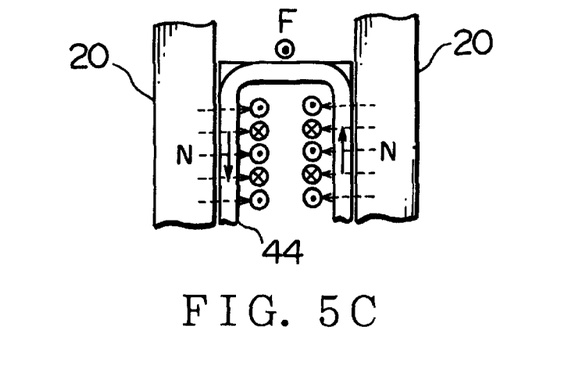

Now, referring to FIGS. 5A, 5B and 5C, an explanation will be given of the movable portion 50 of the lens driving apparatus for the disk player. FIG. 5A is a plan view of the movable portion 50 and yokes 21 provided with magnets 20 and arranged to sandwich it from both sides. FIG. 5B is a schematic view of a portion of the magnets 20, auxiliary yokes 21a and tracking coils 45. FIG. 5C is a schematic view showing a portion of the magnets 20 and focus coil 44. In these figures, dot in a circle denotes the direction of a current or magnetic flux passing from the rear surface of paper to the front surface of paper. Crossing in the circle denotes the direction of the current or magnetic flux passing the front surface of the paper to the rear surface of paper.

FIG. 5A shows the state where the movable portion 50 is hung by the four supporting wires 32 centrally between the pair of yokes 21 to which the magnets spaced apart oppositely from each other by a prescribed magnetic gap are fixed. As seen from FIG. 5A, the N and S poles of the magnet 20 are located on the sides of the movable portion 50 and the yoke 21, respectively. In the vicinity of the central portion of the movable portion 50 where the focus coil 44 is mainly located, the magnetic flux, immediately after it has been diverged from the magnet 20, travels toward the magnets 20 (direction of jitter) to pass through the focus coil 44, but thereafter repel each other to form a magnetic path in a vertical direction of the magnet 20 (direction of focusing). In the vicinity of the tracking coils 45, the magnetic flux, immediately after it has been diverged from the magnet 20, travels toward the magnets 20 (direction of jitter) to pass through the tracking coils 45, but thereafter forms magnetic paths toward the horizontal auxiliary yokes 21a.

Therefore, the focus coil 44 is affected by the magnetic field oriented from the surface of the magnet 20 to the horizontal auxiliary yokes 21a. However, since it is substantially centrally located between the magnets 20, it is dominantly affected by the magnetic field oriented toward the opposite magnets 20. On the other hand, the tracking coils 45 are slightly affected by the magnetic field oriented toward the opposite magnets (direction of jitter). However, since the S-pole auxiliary yokes 21a are arranged adjacently to the magnets 20, the tracking coils 45 are dominantly affected by the magnetic field oriented from the surface of the magnets to the left/right auxiliary yokes 21a.

When the driving current is supplied to the tracking coils 45 in the direction as illustrated in FIG. 5B, within the magnetic field described above, the movable portion 50 undergoes the driving force in the direction of arrow T by the Flemming's left-hand rule. When the driving current is supplied in the direction reverse to the above direction, the movable portion 50 undergoes the driving force in the direction reverse to the direction of arrow T. Thus, the movable portion is driven in the direction of tracking.

When the driving current is supplied to the focus coil 44 in the direction as illustrated in FIG. 5C, the movable portion 50 undergoes the driving force in the direction of arrow F (from the rear face of paper to the front surface thereof) by the Flemming's left-hand rule. When the driving current is supplied in the direction reverse to the above direction, the movable portion 50 undergoes the driving force in the direction reverse to the direction of arrow F. Thus, the movable portion is driven in the direction of focusing.

As described above, in the movable portion according to this embodiment, the outermost periphery of each of the focus coil 44 and the tracking coils 45 is parallel to the outer peripheral edge of the upper wall 42 in the direction of jitter. Therefore, the movable portion 50 can be arranged adjacently to the magnets 20 arranged oppositely to each other. This improves the driving force of the magnetic circuit.

Figure 6A:
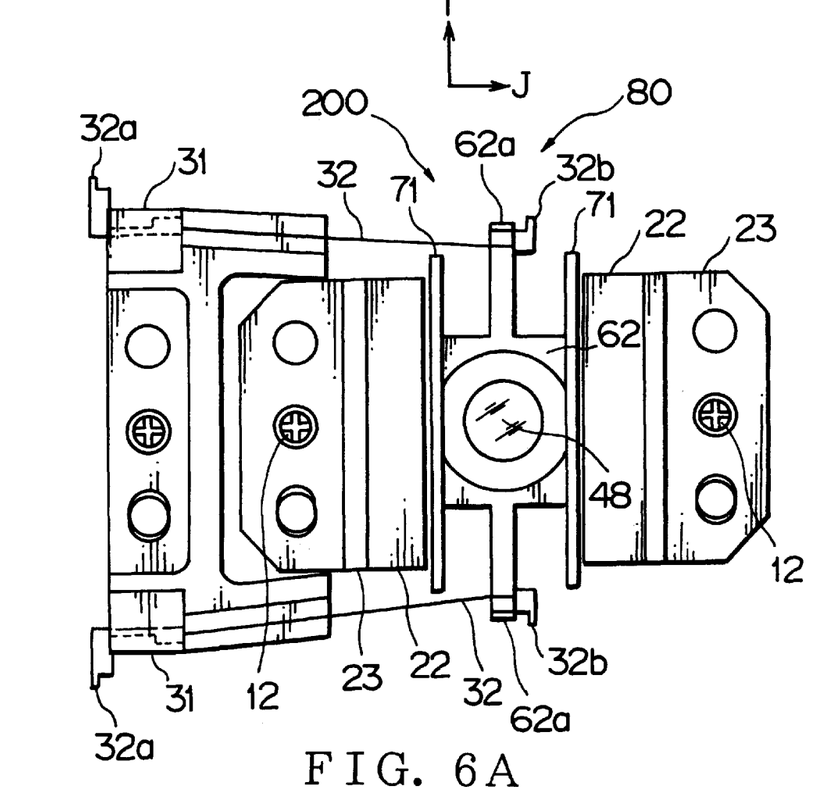
FIGS. 6A and 6B are views showing the structure of a lens driving apparatus for a disk player according to a second embodiment of the invention, respectively.
Figure 6B:
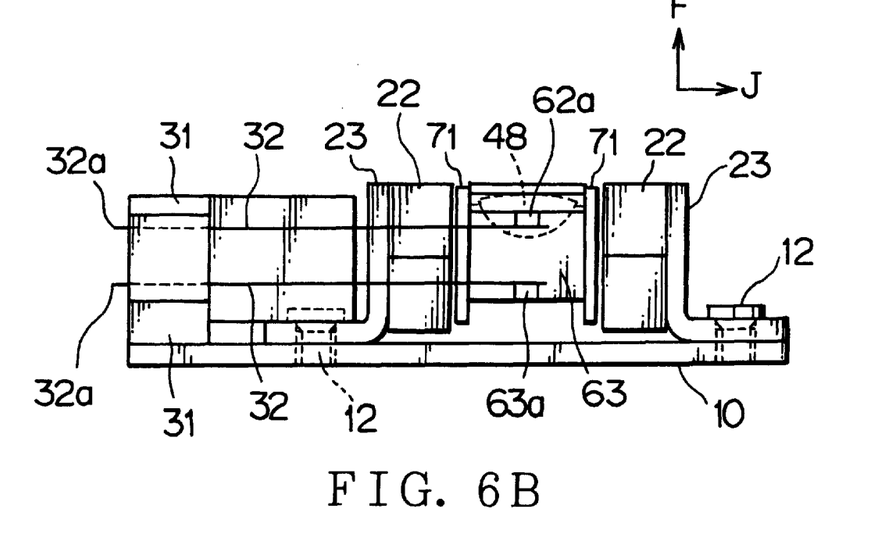

Referring to FIGS. 6A, 6B, 6C, an explanation will be given of the lens driving apparatus for a disk player according to the second embodiment of the invention. FIG. 6A is a plan view of the lens driving apparatus in which the actuator base 10 is omitted. FIG. 6B is a side view of the lens driving apparatus.

In the lens driving apparatus for a disk player according to this embodiment, as seen from the figures, a pair of magnets 22 for generating magnetic fields are fixed to a pair of yokes 23, respectively to generate a magnetic gap therebetween. The pair of L-shaped yokes 21 are oppositely arranged on and fixed to the actuator base (not shown) by plural screws 12 through a fixing member 11. A movable portion 80 is movably hung by four supporting wires 32 on a supporting base 31 that is fixed to the actuator base. The movable portion 51 is arranged within the above magnetic gap.

This embodiment is different from the first embodiment in the shape of a holder 60 constituting a movable portion and in that the focus coil and the tracking coil are constructed of plate-like printed coils 70. The magnet 22 is divided into two parts magnetized with multiple poles.

Figure 7A:
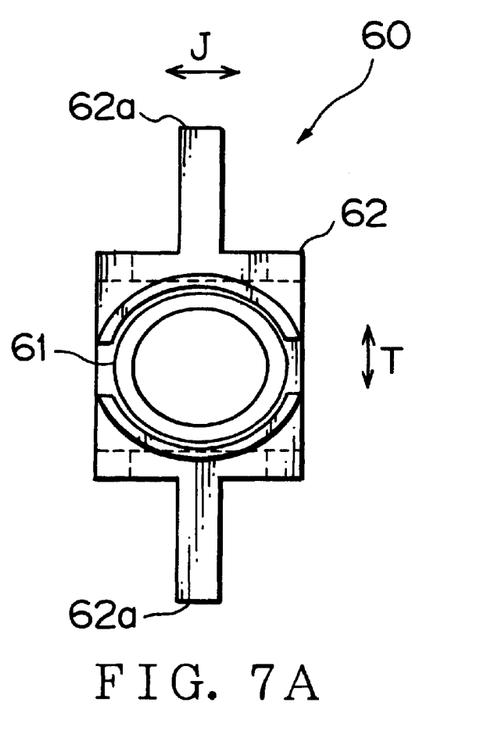
FIGS. 7A to 7C are conceptual views for explaining the holder according to the second embodiment.
Figure 7B:
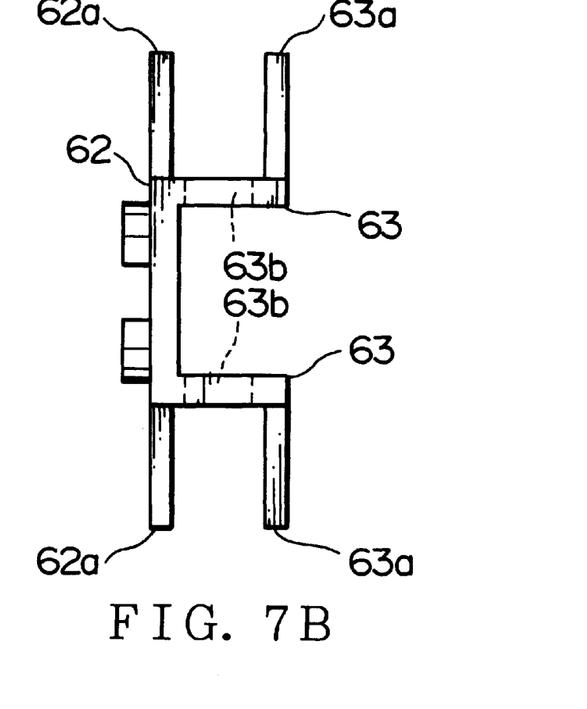
Figure 7C:
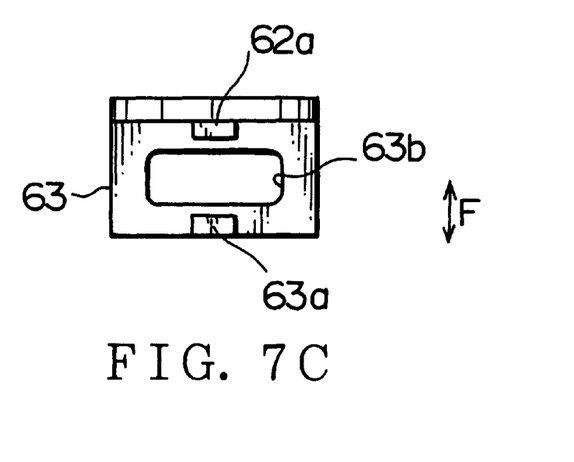

Referring to FIGS. 7A to 7C, an explanation will be given of the structure of a holder 60 used in the lens driving apparatus. FIG. 7A is a top view of the holder 60. FIG. 3B is a side view when the holder is viewed from the direction of jitter (arrow J). FIG. 7C is a side view when the holder is viewed from the direction of tracking (arrow T).

The holder 60 is formed in a square shape by resin molding. The holder 40 includes an opening 61 centrally formed on the upper wall 62 constituting the light path of an objective lens 48, protrusions 62a protruding from both sides of the upper wall 62 (arrow T in the direction of tracking). A pair of side walls 63 coupled with the upper wall 62 are arranged oppositely in the direction of focusing (arrow F). Each of the side walls 63 includes, at its tip, a protrusion 63a which is arranged in parallel to and oppositely to the protrusion 62a. Like the holder 40 in the first embodiment, the left and right side plates aligned in the direction of jitter are removed so that the mass of the holder 60 is reduced and the natural resonance frequency in the direction of jitter can be enhanced. As seen from FIG. 7C, an opening window 63 may be made centrally in each of the side walls 63 of the holder 60 so that the mass of the holder 60 can be further reduced.

In short, the holder 60 in this embodiment is different from the holder in the first embodiment in that the holder 60 does not include the winding portions for winding the focus coil and the tracking coil.

Figures 8A, 8B:
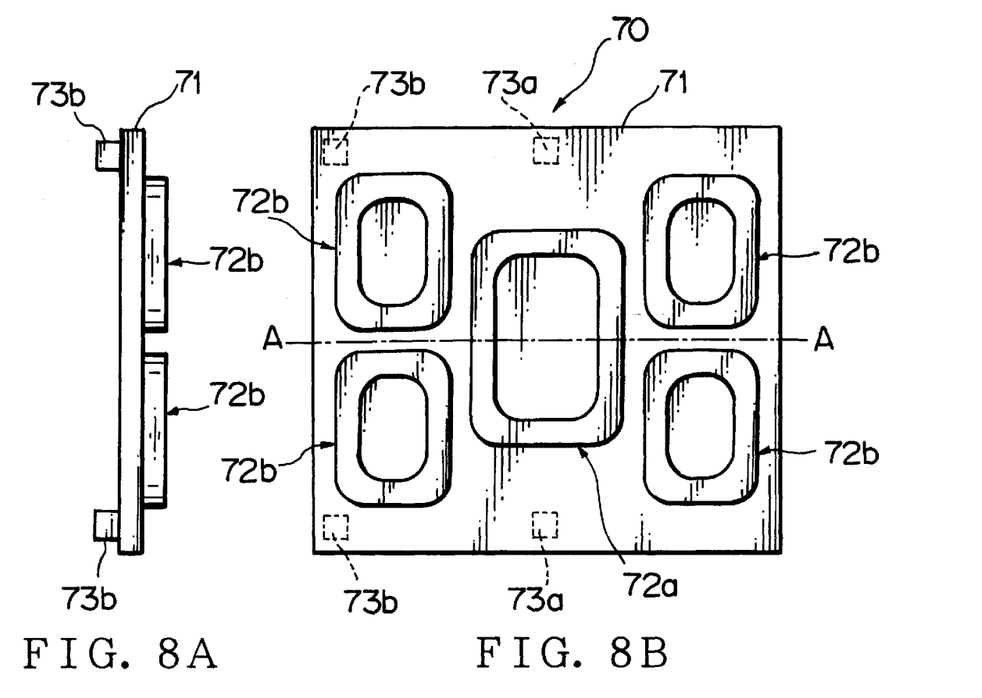
FIGS. 8A and 8B are views of the structure of a plate-like printed coil constituting the movable portion used in the lens driving apparatus according to the second embodiment.

Referring to FIGS. 8A and 8B, an explanation will be given of the structure of the plate-like printed coil 70 constituting the movable portion 80. FIG. 8A is a top view of the plate-like printed coil 70 and FIG. 8B is a side view of the coil 70.

The plate-like printed coil 70 is formed by spirally etching the copper foil coated to the one surface of a planar substrate 71 of e.g. glass epoxy. The printed coil 70 is composed of a single focus coil 72a covered with a protection film on its surface and four tracking coils 72b.

In view of the relative positions of the coil 71 with the magnets 22, a focus coil 72a is formed centrally on the substrate 71, and four tracking coils 72b are arranged on both sides of the substrate 71 apart from the focus coil 72a and at positions opposite to each other with respect to the center line (A—A line) of the focus coil 72a.

The terminal of the focus coil 72a is wire-connected to output terminals 73a formed on the copper foil coated to the other surface of the substrate 71 by means of through-holes. Each of the output terminals is soldered to the one connecting portion 32b of the supporting wire 32 through an extending wire (not shown). The terminals of the four tracking coils 72b connected in series are wire-connected to output terminals 73b formed on the copper foil coated to the other surface of the substrate 71 by means of through-holes. Each of the output terminals are soldered to the other connecting portion 32b of the supporting wire 32 through an extending wire (not shown). The plate-like printed coil 70 can be designed so that plural substrates 71 equipped with the focus coil 72a and tracking coils 72b are stacked and these coils are connected by means of through-holes to provide a large number of turns.

Figure 9:
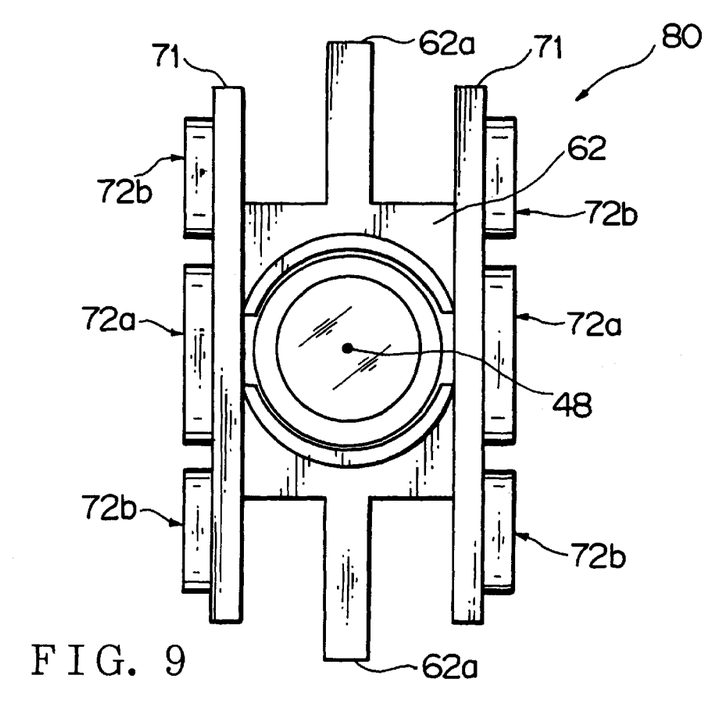
FIG. 9 is a view of the movable portion used in the lens driving apparatus according to the second embodiment.

The movable portion 80 constituting the lens driving apparatus 200 according to the second embodiment as shown in FIG. 9 is structured so that an objective lens is fixed within a holder 60 and the plate-like printed coils 70 are fixed by adhesive on both sides in the direction of jitter of the holder 60, i.e. area formed by removed left/right side plates.

The movable portion 80 is structured so that the plate-like printed coils 70 are fixed on both sides in the direction of jitter of the holder so that the coil planes are in parallel to both directions of focusing and tracking. The movable portion 50 is hung by four supporting wires 32 in such a manner that the protrusions 62b of the upper wall 62 and the protrusions 63b of the side walls 63 are bonded to the four supporting wires 32 and the terminals of the windings are soldered to the connecting portions 32b of the four supporting wires 32. In this state, a driving current is supplied to the focus coil 72a and the tracking coils 72b.

Figure 10A:
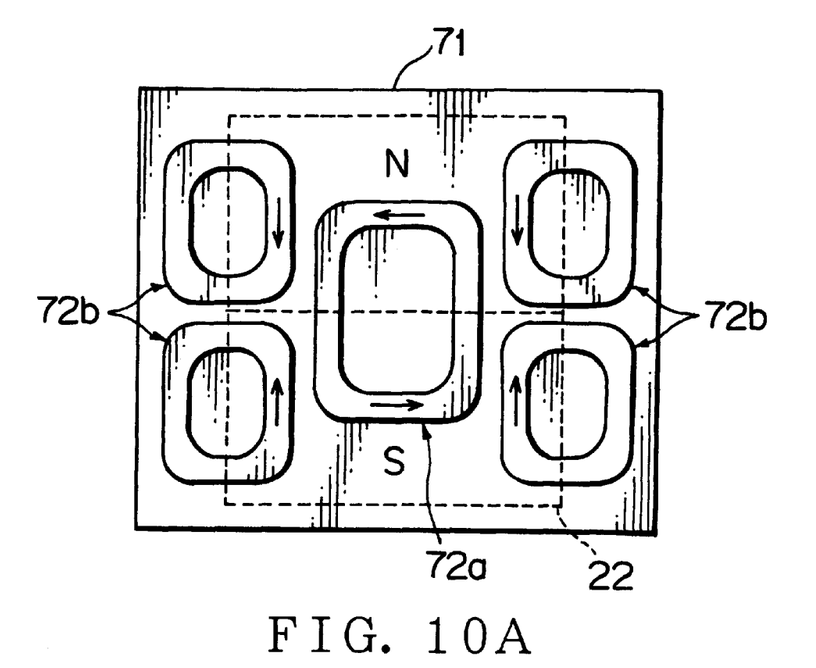
FIGS. 10A to 10C are views for explaining the operation of the movable portion of the lens driving apparatus according to the second embodiment.
Figure 10B:
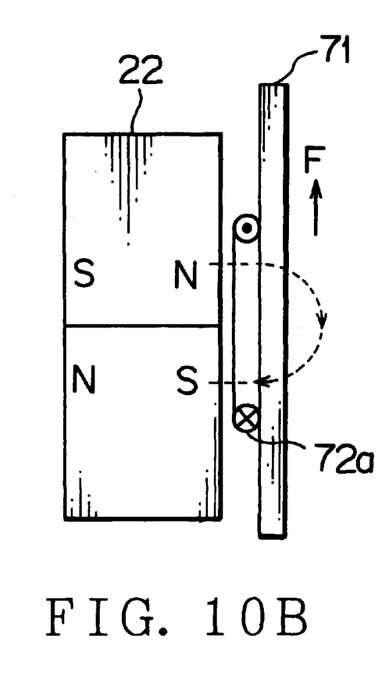
Figure 10C:
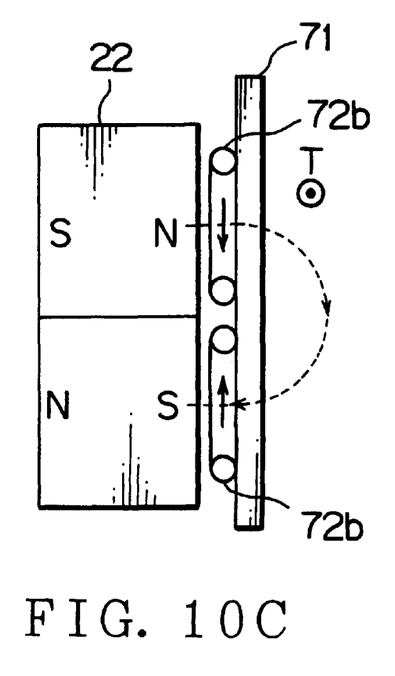

Referring to FIGS. 10A to 10C, an explanation will be given of the driving operation of the movable portion 80.

FIG. 10A shows the relative positions of the magnet 22 and the plate-like printed coil 70 (substrate 71). FIG. 10B shows the relative positions of the magnet 22 and the focus coil 72a formed on the substrate 71 and FIG. 10C shows the relative positions of the magnet 22 and tracking coil 72b formed on the substrate 71.

The magnet 22 is a rectangular member having two different magnetic poles of a first magnetic pole (N-pole) and a second magnetic pole (S-pole) in which they are adjacent to each other in a single magnet divided into two parts magnetized with multi-poles, or otherwise stacked in magnets magnetized with a single-pole of N-pole or S-pole.

As shown in FIG. 10A, the focus coil 72a is arranged across the N-pole and S-pole. Such an arrangement generates a driving force in the direction of focus. Two of four tracking coils 72b are arranged on the side of the N-pole of the magnet 22 so that the half of the inside of the tracking coils 72b in the direction of tracking is located within the magnetic field of the magnet 22. Likewise, other two of four tracking coils 72b are arranged on the side of the S-pole of the magnet 22 so that the half of the inside of the tracking coils 72b in the direction of tracking is located within the magnetic field of the magnet 22. In such an arrangement of the tracking coils 72b, only a part of the tracking coils 72b is affected by the magnetic field to generate the driving force in the direction of tracking.

As shown in FIG. 10B, since the focus coil 72a is arranged across the N-pole and S-pole of the magnet 22, when the driving current flowing from the paper face to this side is supplied, the movable portion 80 undergoes the driving force in the direction of arrow F, i.e. direction of focusing. When the direction of the driving current is reversed, the movable portion 80 undergoes the driving force in the direction opposite to arrow F. Further, as shown in FIG. 10C, since a pair of upper and lower tracking coils 72b are arranged on the sides of N-pole and S-pole of the magnet 22, respectively, when the driving current is supplied in the direction of arrows, the movable portion 80 undergoes the driving force in the direction of T from the paper face to this side, i.e. direction of tracking. When the direction of the driving current is reversed, the movable portion 80 undergoes the driving force in the direction opposite to the direction of T.

As described above, the movable 80 is structured that no winding portion is provided in the holder, but the plate-like printed board 70 is fixed by adhesive to each of the areas where the right/left side plates aligned in the direction of jitter are removed. Therefore, weight or size of the holder 60 can be reduced and also the holder can be reinforced against warping or twisting. Further, the movable portion 80 constructed of the printed coils 70 can be arranged adjacently to the magnet 22 so that the driving force of the magnetic circuit can be further improved.

As described above, in the holders 40 ad 60 according to the first and the second embodiment, since the left and right side plates of the holder are removed, the length of the holder in the direction of jitter can be shortened and the weight thereof can be also reduced. Thus, the movable portion can exhibit the electric characteristics as illustrated in FIG. 11.

Figure 11:
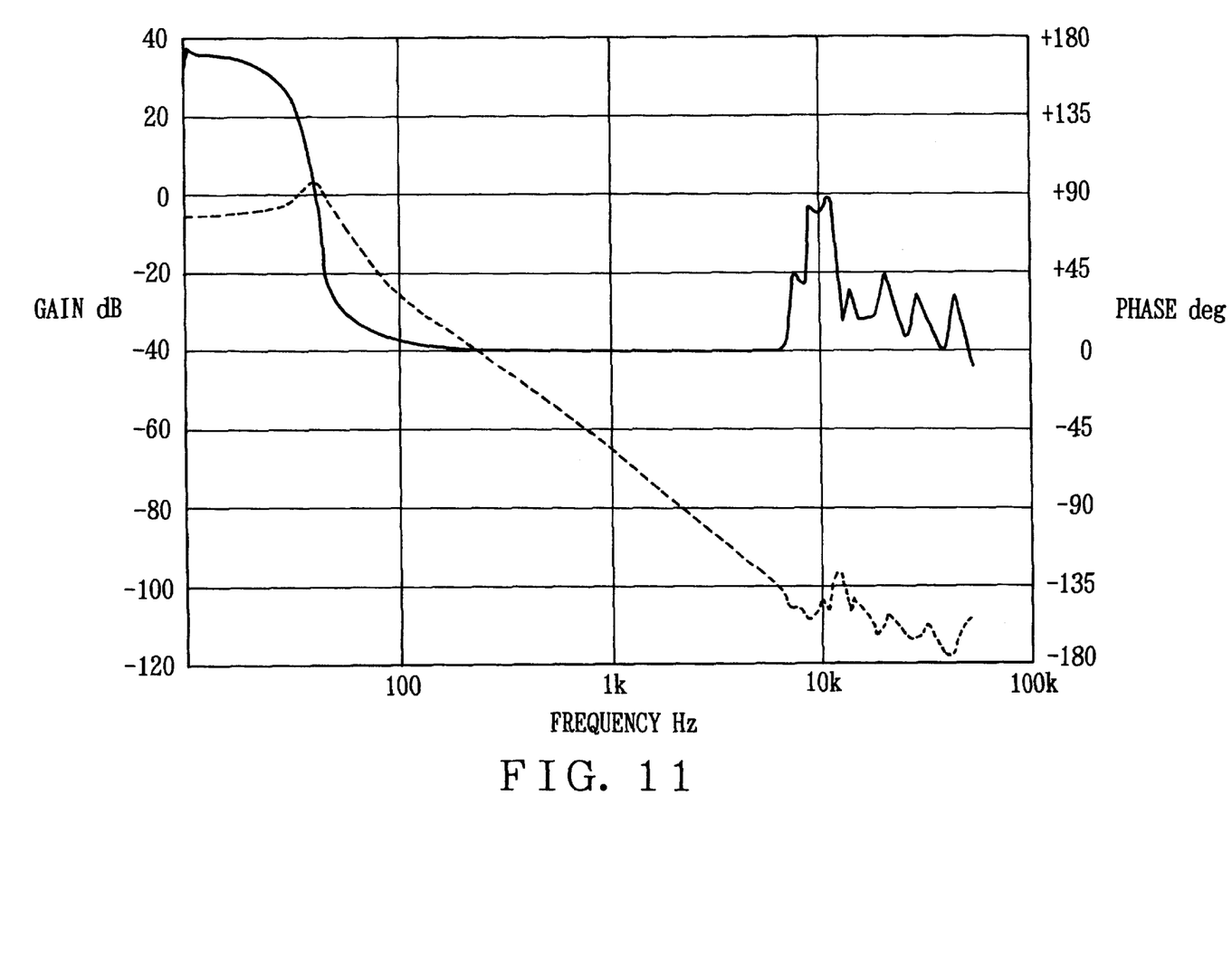
FIG. 11 is a graph showing the electric characteristic of the lens driving apparatus for a disk player according to the present invention.

FIG. 11 is a graph showing the electric characteristic of the movable portion 60 and 80 in the abscissa of frequency and in the ordinate of gain and phase. In the graph, dotted line denotes an amplitude characteristic and solid line denotes a phase characteristic. As shown, although there is a leading phase in the vicinity of 10 kHz, no phase delay occurs over about 100 kHz. It means that the natural resonance frequency has been shifted to the high frequency range over 100 kHz. Thus, when the disk player is operated at the twice or four-times speed, the servo system therefor can make a stable operation.

What is claimed is:

1. A lens driving apparatus for a disk player for movably supporting a holder with an objective lens and a driving coil, wherein said holder comprises an upper wall on which said objective lens is fixed;
   a pair of side walls which are integral to said upper wall and aligned apart from each other in a direction of tracking;
   said holder having no other side walls adjacent to the side walls in said pair of side walls; and
   said driving coil is wound on each of side edges of said pair of side walls of said holder.

2. A lens driving apparatus according to claim 1, wherein said holder is formed in a square shape, and said driving coil is wound on an area of said side aligned in a direction of jitter.

3. A lens driving apparatus for a disk player for movably supporting a holder with an objective lens and a driving coil in directions of focusing and tracking, wherein said holder comprises an upper wall on which said objective lens is fixed;
   a pair of side walls which are integral to said upper wall and aligned apart from each other in a direction of tracking;
   said holder having no other side walls adjacent to the side walls in said pair of side walls; and
   said driving coil comprises a plate-like printed coil which generates driving force in the directions of focusing and tracking and has a coil surface in parallel to each of side edges of said pair of side walls of said holder in both directions of tracking and focusing.

4. A lens driving apparatus according to claim 3, wherein said holder is formed in a square shape, and said plate-like printed coil is located on an area of each said side walls aligned in a direction of jitter.

5. A lens driving apparatus for a disk player for movably supporting a holder with an objective lens and a driving coil in directions of focusing and tracking, wherein said holder comprises an upper wall on which said objective lens is fixed;
   a pair of side walls which are integral to said upper wall and aligned apart from each other in a direction of tracking;
   said holder having no other side walls adjacent to the side walls in said pair of side walls; a pair of arms aligned apart from each other in a direction of focusing and protruding from the holder in the direction of tracking; and
   said driving coil comprises a focus coil wound on said pair of side walls and a tracking coil wound on the said pair of arms.

6. A lens driving apparatus for a disk player according to claim 5, wherein said holder is formed in a square shape, and said focus coil provides a magnetic flux in a space between said side walls.

7. A lens driving apparatus for a disk player for movably supporting a holder with an objective lens and a driving coil, wherein said holder comprises:
   a first wall on which said objective lens is fixed;
   a pair of side walls which are integral to said first wall and aligned apart from each other in a direction of tracking; and
   said holder having no other side wall adjacent to both of the side walls in said pair of side walls.

8. The lens driving apparatus of claim 7 wherein said holder further comprises a driving coil placed on an area of said side walls and aligned in a direction of jitter.

9. The lens driving apparatus of claim 8 wherein said holder further comprises a driving coil wound on each of side edges of said pair of side walls of said holder.

10. The lens driving apparatus of claim 7 wherein said holder further comprises a driving coil, wherein said driving coil comprises:
    a plate-like printed coil which generates driving force in the directions of focusing and tracking; and
    a coil surface in parallel to each of side edges of said pair of side walls in both directions of tracking and focusing.

11. The lens driving apparatus of claim 10 wherein the plate-like printed coil is located on an area of said side walls and aligned in a direction of jitter.

12. The lens driving apparatus of claim 7 wherein the lens holder further comprises a pair of arms aligned apart from each other in a direction of focusing and protruding from the holder in a direction of tracking.

13. The lens driving apparatus of claim 12 wherein the driving coil comprises a focus coil placed on said pair of side walls and a tracking coil placed on said pair of arms.

14. The lens driving apparatus of claim 12 wherein the driving coil further comprises a plate-like printed coil which generates driving force in the directions of focusing and tracking; and
    a coil surface in parallel to each of side edges of said pair of side walls in both directions of tracking and focusing.

15. A lens driving apparatus for a disk player for movably supporting a holder with an objective lens and a driving coil, wherein said holder comprises:
    a face on which an objective lens is fixed;
    a pair of side walls which are integral to the face, which are separated from each other, and which are aligned in a predetermined direction,
    wherein no wall is orthogonal to said predetermined direction,
    wherein the driving coil is arranged so that a portion of the driving coil which generates a main driving force is arranged in a direction perpendicular to said predetermined direction.

16. The lens driving apparatus according to claim 15 wherein said driving coil is a focus coil.

17. The lens driving apparatus according to claim 15 wherein said driving coil is a winding coil.

18. The lens driving apparatus according to claim 15 wherein said driving coil is a print coil.

19. The lens driving apparatus according to claim 15 wherein said predetermined direction is a tracking direction.

* * * * *